United States Patent
Sahin et al.

(10) Patent No.: US 11,578,229 B2
(45) Date of Patent: Feb. 14, 2023

(54) GELATIN OR PECTIN BASED ANTIMICROBIAL SURFACE COATING MATERIAL

(71) Applicant: YEDITEPE UNIVERSITESI, Istanbul (TR)

(72) Inventors: Fikrettin Sahin, Istanbul (TR); Zeynep Iyigundogdu, Istanbul (TR); Okan Demir, Istanbul (TR); Merve Gulerim, Istanbul (TR); Sanem Argin, Istanbul (TR)

(73) Assignee: YEDITEPE UNIVERSITESI, Istanbul (TR)

( * ) Notice: Subject to any disclaimer, the term of this patent is extended or adjusted under 35 U.S.C. 154(b) by 1046 days.

(21) Appl. No.: 16/323,270

(22) PCT Filed: Jul. 14, 2017

(86) PCT No.: PCT/TR2017/050321
§ 371 (c)(1),
(2) Date: Feb. 5, 2019

(87) PCT Pub. No.: WO2018/063118
PCT Pub. Date: Apr. 5, 2018

(65) Prior Publication Data
US 2021/0301170 A1    Sep. 30, 2021

(30) Foreign Application Priority Data
Aug. 5, 2016 (TR) ................. 2016/10999

(51) Int. Cl.
*C09D 105/06* (2006.01)
*C09D 7/61* (2018.01)
(Continued)

(52) U.S. Cl.
CPC .......... *C09D 105/06* (2013.01); *B65D 81/28* (2013.01); *C08K 3/38* (2013.01); *C09D 5/025* (2013.01);
(Continued)

(58) Field of Classification Search
None
See application file for complete search history.

(56) References Cited

U.S. PATENT DOCUMENTS

| | | | | |
|---|---|---|---|---|
| 2001/0024678 A1* | 9/2001 | Scott | ........................ | A61K 8/65 |
| | | | | 430/642 |
| 2003/0228439 A1* | 12/2003 | Kawakami | ............... | B41M 5/41 |
| | | | | 428/65.2 |
| 2004/0204316 A1* | 10/2004 | Tsurumi | ................... | B41M 5/44 |
| | | | | 503/201 |

FOREIGN PATENT DOCUMENTS

| | | |
|---|---|---|
| CA | 2735531 A1 | 9/2012 |
| CN | 103877168 A | 6/2014 |

(Continued)

OTHER PUBLICATIONS

Derwent—Acc—No. 2015-218429 for English language abstract for CN 104335849 A (Feb. 11, 2015).*
(Continued)

*Primary Examiner* — Joseph D Anthony
(74) *Attorney, Agent, or Firm* — Bayramoglu Law Offices LLC (57) ABSTRACT

The present invention relates to a gelatin or pectin based antimicrobial surface coating material. In the present invention, boron compounds are mixed with gelatin or pectin and a surface coating material in the form of a film is obtained. The said coating material can be used in all packaging
(Continued)

industry requiring hygiene particularly in food industry. The invention enables packages to be antifungal, anticandidal and antibacterial.

20 Claims, 9 Drawing Sheets

(51) Int. Cl.
    *C09D 5/25*     (2006.01)
    *B65D 81/28*     (2006.01)
    *C08K 3/38*     (2006.01)
    *C09D 5/02*     (2006.01)

(52) U.S. Cl.
    CPC .......... *C09D 7/61* (2018.01); *C08K 2003/387* (2013.01)

(56) References Cited

FOREIGN PATENT DOCUMENTS

| | | |
|---|---|---|
| CN | 104559075 A | 4/2015 |
| FR | 2732687 A1 | 10/1996 |
| GB | 881728 A | 11/1961 |
| WO | 2010016034 A2 | 2/2010 |
| WO | 2014168595 A1 | 10/2014 |

OTHER PUBLICATIONS

Derwent—Acc—No. 2010-D16330 for English language abstract for CN 101666128 A (Mar. 10, 2010).*
S.D.F. Mihindukulasuriya and L.T. Tim. "Nanotechnology Development in Food Packaging: A Review". Trends in Food Science & Technology, 40:149-167, 2014.
B. Luijsterburg ve H. Goossens. "Assessment of plastic packaging waste: Material origin, methods, properties". Resources, Conservation and Recycling, 2014, 85:88-97.
Han, J. H. 2003. Antimicrobial food packaging. In: Ahvenainen R. (Eds), Novel food packaging techniques. CRC Press, sayfa. 50-70.
P.Prasad ve A. Kochhar. "Active Packaging in Food Industry: A Review". IOSR Journal of Environmental Science, Toxicology and Food Technology, 8:2319-2402, 2014.
L.J. Bastarrachea, D.E. Wong, M.J. Roman, Z. Lin ve J.M. Goddard. "Review Active Packaging Coatings". Coatings, 5:771-791, 2015.
Muriel-Galet, V., Cerisuelo, J.P., Lopez-Carballo G, Aucejo S., Gavara R., Hernandez-Munoz, P. "Evaluation of EVOH-coated PP films with oregano essential oil and citral to improve the shelf-life of packaged salad." Food Control, 30, 137-143. 2013.
Cerisuelo, J. P., Bermudez, J.M., Aucejo S., Catala R., Aucejo S., Hemandez-Munoz P. "Describing and modeling the release of an antimicrobial agent from an active PP/EVOH/PP package for salmon". J. of Food Engineering. 116, 352-361. 2013.
Ravishankar, S., Jaroni, D., Zhu, L., Olsen, C., McHugh, T., Friedman, M. "Inactivation of Listeria monocytogenes on Ham and Bologna Using Pectin-Based Apple, Carrot, and Hibiscus Edible Films Containing Carvacrol and Cinnamaldehyde." J. Food Science. 77, 7, M377-382. 2012.
Galotto, M.J., Valenzuela, X., Rodriguez, F., Bruna, J., Guarda, A. "Evaluation of the Effectiveness of a New Antimicrobial Active Packaging for Fresh Atlantic Salmon (*Salmo salar* L.) Shelf Life". Packag. Technol. Sci.; 25:363-372. 2012.
Suppakul, P., Miltz, J., Sonneveld, K., Bigger, S.W. "Antimicrobial properties of basil and its possible application in food packaging". Journal of Agricultural and Food Chemistry, 51, 3197-3207. 2003.
Suppakul, P., Sonneveld, K., Bigger, S. W. Miltz, J. "Efficacy of polyethylene-based antimicrobial films containing principal constituents of basil". LWT Food Science and Technology, 41, 779-788. 2008.
A.C.K. Bierhalz, M.A. Da Silva and T.G. Kieckbusch. "Natamycin Release from Alginate/Pectin Films for Food Packaging Applications". Journal of Food Engineering, 110:18-25, 2012.
P.J. Espitia, R.J. Avena-Bustillos, W.X. Du, R.F. Teofilo, N.F.F Soares and T.H. McHugh. "Optimal Antimicrobial Formulation and Physical-Mechanical Properties of Edible Films Based on Açaí and Pectin for Food Preservation". Food Packaging and Shelf Life, 2:38-49, 2014.
C.G. Otoni, M.R. De Moura, F.A. Aouada, G.P. Camilloto, R.S. Cruz, M.V. Lorevice, N.F.F. Soares and L.H.C. Mattoso. "Antimicrobial and Physical-Mechanical Properties of Pectin/Papaya Puree/Cinnamaldehyde Nanoemulsion Edible Edible Composite Films". Food Hydrocolloids, 41:188-194, 2014.
J.F. Martucci, L.B. Gende, L.M. Neira ve R.A. Ruseckaite. "Oregano and Lavender Essential Oils as Antioxidant and Antimicrobial Additives of Biogenic Gelatin Films". Industrial Crops and Products, 71:205-213, 2015.
Bailey P. J., G. Cousins, G. A. Snow, White A.J. "Boron-Containing Antibacterial Agents: Effects on Growth and Morphology of Bacteria Under Various Culture Conditions". Antimicrobial Agents and Chemotherapy, 17, 549-553. 1980.
Benkovic S.J., S.J. Baker, ve Alley M.R. "Identification of borinic esters as inhibitors of bacterial cell growth and bacterial methyltransferases, CcrM and MenH". Journal of Medicinal Chemistry, 48, 7468-7476. 2005.
Reynolds, R.C., Campbell S.R., Fairchild R.G., Kisliuk R.L., Micca P.L., Queener S.F., Riordan J.M., Sedwick W.D., Waud W.R., Leung A.K.W., Dixon R.W., Suling W.J., Borhani D.W. "Novel boron-containing, nonclassical antifolates: Synthesis and preliminary biological and structural evaluation". Journal of Medicinal Chemistry, 50, 3283-3289. 2007.
Qin, G.S. Tian, Z. Chan, B. Li. "Crucial role of antioxidant proteins and hydrolytic enzymes in pathogenicity of Penicillium expansum". Molecular & Cellular Proteomics, 6, 425-438. 2007.
Qin, G.,Y. Zong, Q. Chen, D. Hua, S. Tian "Inhibitory effect of boron against Botrytis cinerea on Tablo grapes and its possible mechanisms of action". International Journal of Food Microbiology, 138, 145-150. 2010.
Lalitha, M. K., Vellore, T.N. "Manual on antimicrobial susceptibility testing", URL: http://www. ijmm.org/documents/Antimicrobial. doc. 2005.

* cited by examiner

GELATIN OR PECTIN BASED ANTIMICROBIAL SURFACE COATING MATERIAL

FIELD OF THE INVENTION

The present invention relates to a gelatin or pectin based antimicrobial surface coating material.

BACKGROUND OF THE INVENTION

The primary purpose in food packaging is to protect the food from factors such as oxygen, light, microbial contamination, chemical and physical degradation until the food reaches the consumer. The food package serves as a barrier between the food and the outer environment. The food package also plays an important role in ensuring food quality and safety, extending shelf life, minimizing waste of food, and reducing the preservatives added to the food [1].

The most important chemical and biochemical reactions causing quality losses or food safety problems are the enzymatic and non-enzymatic browning reactions, oil hydrolysis, oil oxidation, protein denaturation, hydrolysis of oligo and polysaccharides, and denaturation of several pigments. In addition to the chemical reactions; microbial degradation caused by bacteria, yeasts and fungi is another important factor impacting food quality and safety.

While food degradation can occur during production phase it may also occur during transportation and storage. This causes quality losses and food safety problems. While shelf life of the food is related to all of the phases in the food production, packaging phase is among the most important ones of these phases. When shelf lives of the food products are being determined, first of all microbial reliability and then chemical and sensory quality factors are evaluated. Some products may get affected by external factors although they are packaged. Shelf lives of the products may be increased by keeping some of the parameters in the external environment under control [1, 2].

Glass, paper, cardboard, wood, aluminum, can, plastic and plastic based packaging materials can be given as examples of conventional food packaging methods. Plastics are the most preferred type of packaging due to various advantages thereof. Plastics are widely preferred for use as packaging materials due to their properties of being inexpensive and lightweight, easy to process, transparent and ability to be produced in different colors, ability to be very rigid or flexible depending on purpose of use, being resistant against low or high temperatures, having gas permeability of various levels, being resistant against oils and solvents, being inert in general. In addition to these advantages, the fact that the plastics remain undegraded in nature for many years is the most important disadvantage [3].

Parallel to the innovations in food production technology, food packaging technology also exhibits continuous development. Biodegradable packaging, active packaging, smart packaging and packaging systems produced with nanotechnology are among the most important innovative packaging systems. One of the most important reasons of developing this type of packaging systems is to minimize waste of food when supplying food to the human population which is increasing day by day by delaying food degradation [1].

Antimicrobial active packaging process is one of the new technologies, and it enables to integrate one or more antimicrobial compounds to the packaging material and to protect the food from spoilage by release of the said compound(s) from the packaging material to the surface of the food product throughout the shelf life. The package releasing an antimicrobial agent is a packaging system which inactivates the microorganisms causing food spoilage, prevents spoilage and extends shelf life of the food products. Packages having antimicrobial activity reduce the growth rate of microorganisms or the number of viable cells thereby extending the lag period [4]. Different organic and inorganic antimicrobial agents are used in the packaging material. The antimicrobial agents that will be used in a food package should be safe and comply with the food or packaging regulations.

Biopolymer based new packaging systems have been required to be developed in order to solve the environmental solid waste problems originating from use of petrochemical plastic packages. Urbanization, downsizing food portions, increase in consumption of readymade food and the fact that packaging materials degrade in nature after a certain period of time have enabled to decrease environmental problems originating from package garbage. Biodegradable polymer is viewed as a promising technology since it is environmentally friendly, decomposes in nature and is renewable [2, 5].

Active packaging systems are obtained by contributing different functional features to the package besides its barrier function by adding various active components to the packaging materials or by using functional polymers. For active packaging, active content is added into the coating material in order to meet desired migration or stability properties. In the controlled release systems, the active content is added into the polymeric matrix so that it can migrate and exhibit its antioxidant, antimicrobial or nutraceutical properties [2, 5].

Antimicrobial packaging is a type of active packaging. While antimicrobial active agents can be added directly to the packaging material in order to reduce the microbial load in the food and the contamination that might be caused by food pathogens, the food packaging can also be completely made of an antimicrobial polymer. Active antimicrobial packaging systems enable antimicrobial activity by reducing the growth rate and the number of microorganisms as well as by extending the lag phase [6, 7].

Gelatin is an additive used for improving textural and rheological properties of various food products in food industry. It is generally used for gelling, condensation, film forming, water binding, thickening, texturizing and stabilizing. In frozen food products, gelatin prevents crystallization of water and sugar thereby preventing degradation in the structures and textures of these food products. The gelatin used in ice creams prevents separation of the water phase by its water binding feature, and furthermore increases concentration of the product and is used for controlling foam formation during the production. Gelatin is also used as a coating material because of its gelling and film forming properties. Gelatin is further used as a wall material in microencapsulation applications and aroma encapsulation is an example of this. In the recent years, gelatin is also used in food coating applications as a carrier.

Pectin is widely used in fruit juices, jams, jellies, marmalades, fruit candies and milk products due to its gelling, thickening, emulgator and stabilizer properties in food products. Pectin is also used in some drug compositions used against diarrhea in drug industry.

Among the studies available in the literature, Muriel-Galet et al. developed an antimicrobial EVOH (ethylene vinyl alcohol) film by using oregano essential oil and citral, and coated this film over a corona treated PP (polypropylene) film surface [8]. A bag is produced from the material that is developed and it is used for packaging of a readyto-eat salad mixture. It was determined that particularly in the beginning, bacteria, yeast and fungus load in the products decreased during the shelf life and that the shelf life was extended.

Cerisuelo et al. similarly developed a PP/EVOH/PP packaging material using carvacrol as an antimicrobial agent and used this active film as the upper film for the salmon fish placed in plastic cans, and stated that carvacrol extends shelf life of the fish [9]. Carvacrol is used as an additive in edible films due to its antimicrobial property and enables to extend shelf life of various meat products such as chicken, ham and sausage [10, 11]. Since thymol also has a high antimicrobial property like carvacrol, it can be used as active substance in plastic films and edible films [12]. Suppakul et al. compiled information regarding effects of basil volatile oil on microorganisms and potential opportunities of its use as a food additive and for antimicrobial packaging [13]. Suppakul et al. integrated linalool and methylchavicol, which are basil oil components, into LDPE and used it for cheese [14]. They disclosed that the films they have developed have a high antimicrobial activity and do not change sensory properties of the cheese.

In addition; antibacterial activity against *Escherichia coli, Salmonella enterica, Listeria monocytogenes* and *Staphylococcus aureus* is obtained by adding papaya puree and cinnamaldehyde to the pectin film material [15]. Moreover, antibacterial activity has been achieved against *E. Coli* and *L. monocytogenes* by adding silver nanoparticles and nanoclay [16]; against *E. coli* and *S. Aureus monocytogenes* by adding oregano and lavender essential oil [17]; and against *E. coli, L. monocytogenes* by adding zinc oxide nanoparticles [18].

There are studies in the literature on the antimicrobial properties of boron compounds. Bailey et al. (1980) proved, with the experiments they conducted, that boric acid has antibacterial activity on enteric bacteria. Antibacterial agents containing boron were tried on gram negative (G (−)) bacteria and were observed to be effective [19]. Another study showed that boric esters have a broad spectrum antibacterial activity [20].

Reynold et al. (2007) showed that lipophilic 2,4-diamino-6-methylpyrimidine antifolate compound, which comprises two different borons, has a moderate level antibacterial activity against the bacteria *Mycobacterium avium* and *Lactobacillus casei* [21].

A study by Qin et al. showed that 0.1% potassium tetraborate is the minimum concentration to inhibit micelle growth of *Penicillium expansium* [22].

Qin et al. (2010), in their other studies, have shown that 1% potassium tetraborate can control growth of *Botrytis cinerea* which leads to gray mold disease [23].

Chinese patent document no. CN104559075 discloses a packaging material which is made of a high-temperature-resistant fresh-keeping boron-containing polyester film.

Canadian patent document no. CA2735531 discloses organoboron compounds used in food packaging.

SUMMARY OF THE INVENTION

The objective of the present invention is to obtain an antimicrobial surface coating material by using boron compounds together with gelatin or pectin based materials.

Another objective of the present invention is to provide an antifungal surface coating material.

A further objective of the present invention is to provide an anticandidal surface coating material.

Another objective of the present invention is to provide an antibacterial surface coating material.

Another objective of the present invention is to provide a surface coating material which prevents biodegradation or biocontamination.

Another objective of the present invention is to provide an easy-to-produce and low-cost surface coating material.

DETAILED DESCRIPTION OF THE INVENTION

Within the scope of the present invention, film strips, which will be used as antimicrobial surface coating material, are produced by combining boron compounds with gelatin or pectin based chemicals.

The "Gelatin or Pectin Based Antimicrobial Surface Coating Material" developed to fulfill the objective of the present invention is illustrated in the accompanying figures, in which.

The experimental studies conducted for the method of obtaining antimicrobial coating material by using boron compounds are as follows.

EXPERIMENTAL STUDIES

Film Production

Gelatin and low-methoxyl pectin-based films were prepared by solvent casting method.

For preparation of the gelatin films, 3 g glycerol (used as the plasticizer) and 10 g powder gelatin were dissolved in 97 mL double distilled water (ddw) under stirring at 700 rpm for 30 minutes at 50° C. At the same time, 5% to 15% by mass of boron compounds (Boric Acid or Disodium Octaborate or Sodium Pentaborate) were dissolved in 20 mL ddw and added dropwise into the gelatin solution. The obtained solution was stirred for 30 minutes and poured on a flat surface, and it was allowed to stand at room temperature for 48 hours until the solvent evaporated. This method was repeated for different boron compounds at different concentrations.

For preparation of the pectin-based films, 3 g glycerol and 2 g pectin were dissolved in 70 mL ddw under stirring at 700 rpm for 30 minutes at 60° C. At the same time, 5% to 15% by mass of boron compounds (Boric Acid or Disodium Octaborate or Sodium Pentaborate) were dissolved in 15 mL ddw and added dropwise to pectin solution. A solution which was separately obtained by dissolving 0.025 g in a 15 mL ddw was added dropwise to the pectin-boron compound solution. The obtained solution was stirred for 10 minutes and poured on a flat surface, and it was allowed to stand at room temperature for 72 hours until the solvent evaporated. This method was repeated for different boron compounds at different concentrations. As a result of these procedures, antimicrobial film samples were obtained.

Particularly and preferably Boric acid (BA), Disodium Octaborate (DO), and Sodium Pentaborate (SP) were used as boron compounds in the experimental studies conducted for obtaining the product of the present invention.

Characterization Studies and Tests

Characterization of the Developed Surfaces

Surface characterization of the boron-doped antimicrobial gelatin and pectin based film surfaces of the present invention were performed. Rheological, mechanical and morphological properties of the developed film surfaces were examined comparatively with the control groups.

Antimicrobial Tests

Modified Disc Diffusion Method

Figure 1:
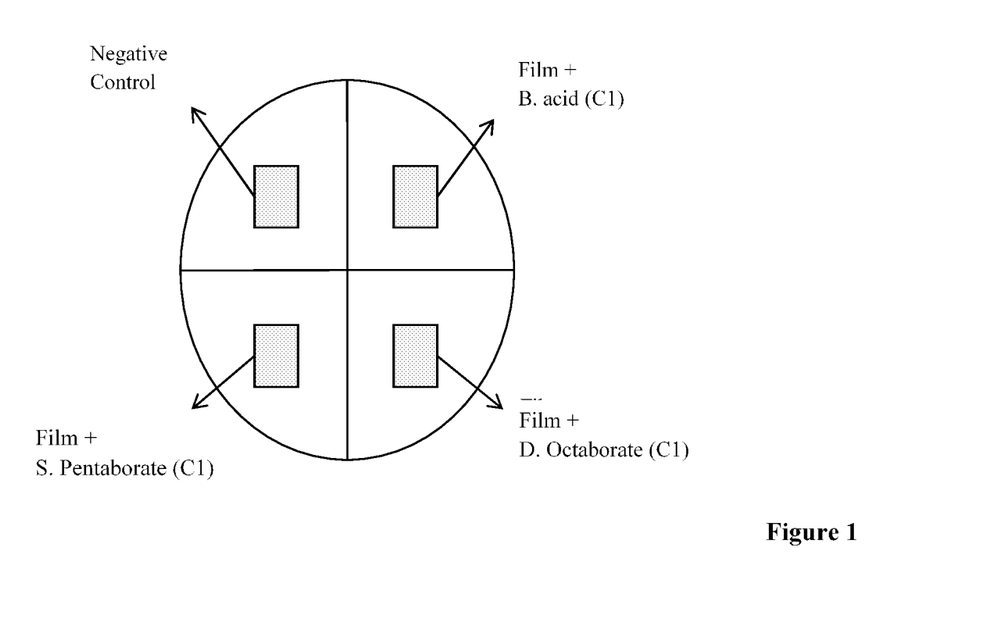
FIG. 1 is a view of the layout of the boron-containing film in the petri dish.
Figure 2:
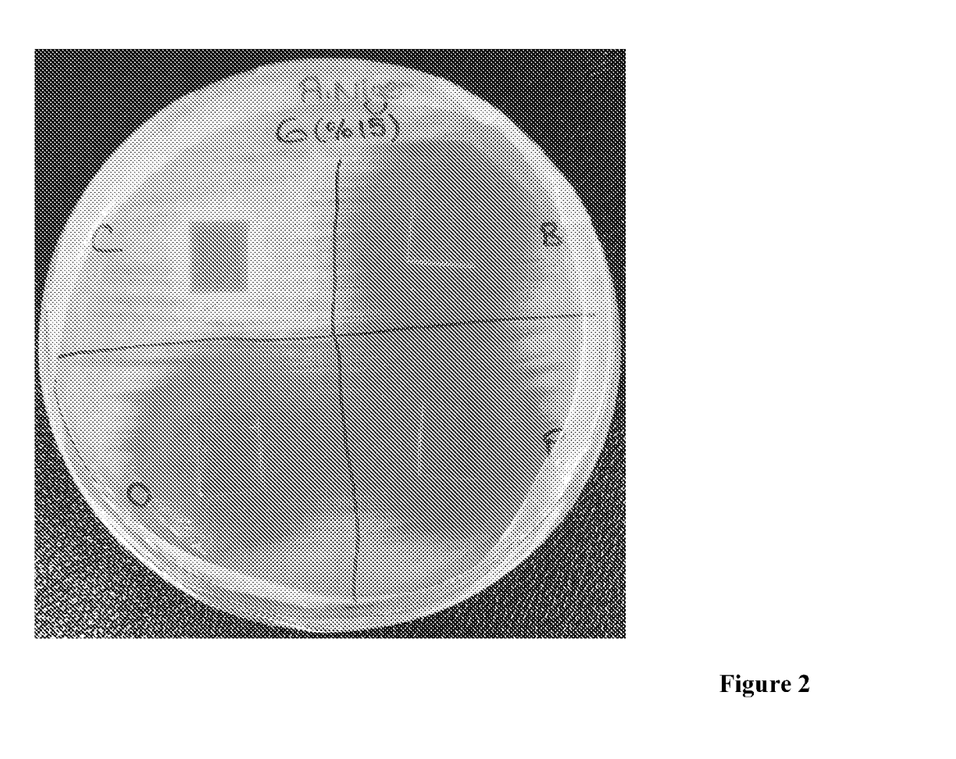
FIG. 2 is a view of the antifungal activity of the 15% boron compound-doped gelatin films on the fungus *Aspergillus niger*.
Figure 3:
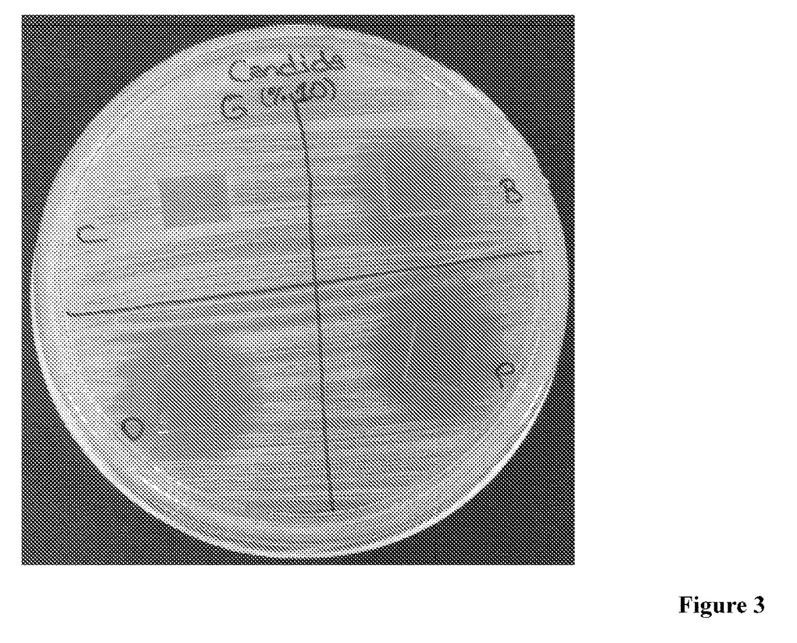
FIG. 3 is a view of the antifungal activity of the 10% boron compound-doped gelatin films on *Candida albicans* yeast.
Figure 4:
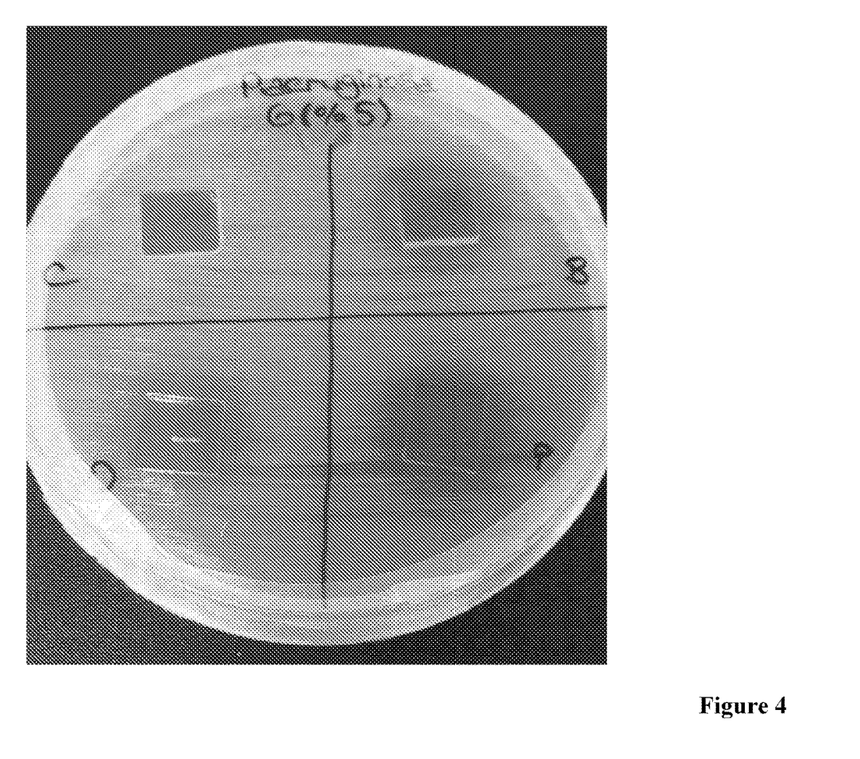
FIG. 4 is a view of the antibacterial activity of the 5% boron compound-doped gelatin films on *Pseudomonas aeruginosa* bacteria.
Figure 5:
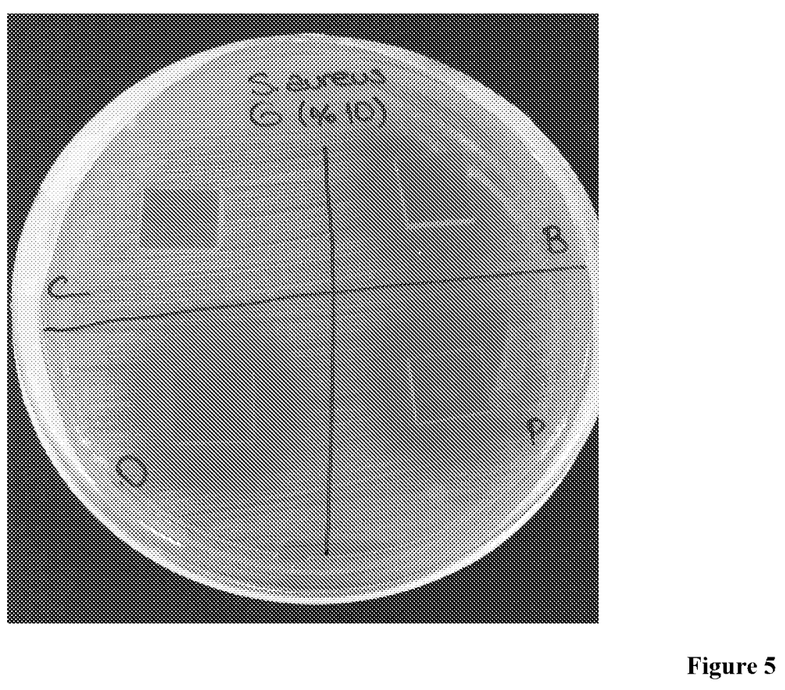
FIG. 5 is a view of the antibacterial activity of the 10% boron compound-doped gelatin films on *Staphylococcus aureus* bacteria.
Figure 6:
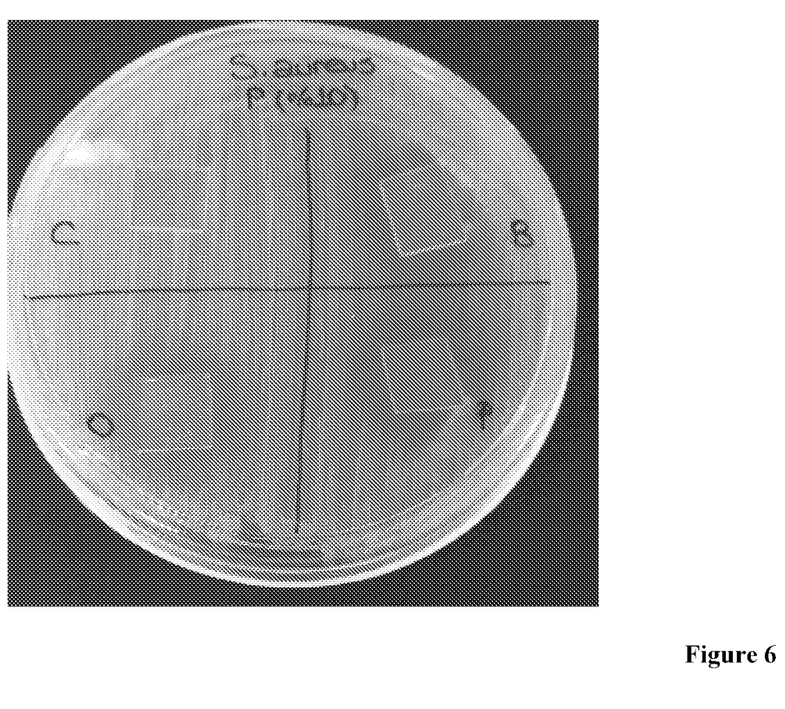
FIG. 6 is a view of the antibacterial activity of the 10% boron compound-doped pectin films on *Staphylococcus aureus* bacteria.
Figure 7:
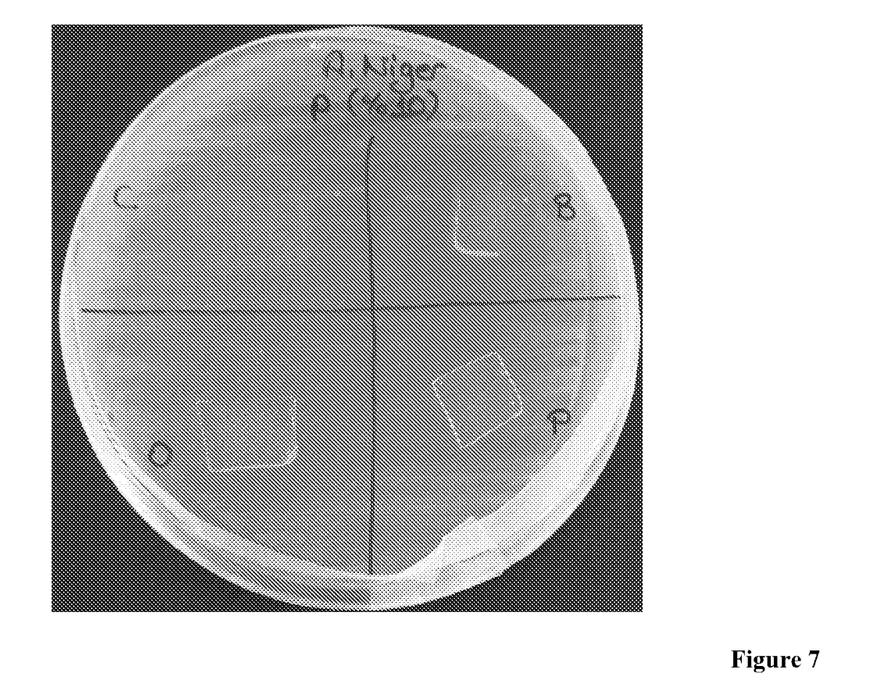
FIG. 7 is a view of the antifungal activity of the 10% boron compound-doped pectin films on the fungus *Aspergillus niger*.
Figure 8:
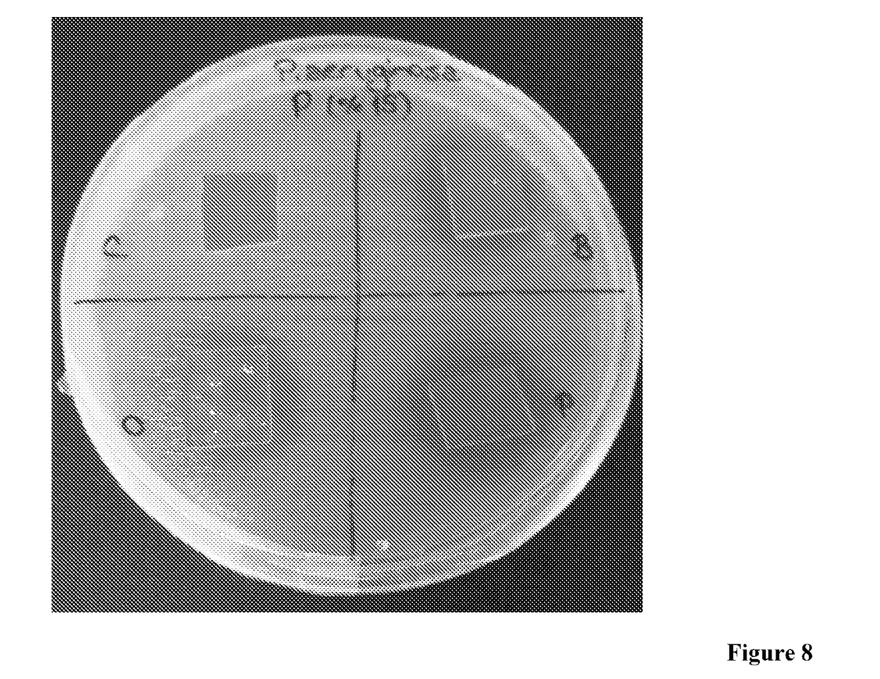
FIG. 8 is a view of the antibacterial activity of the 15% boron compound-doped pectin films on *Pseudomonas aeruginosa* bacteria.
Figure 9:
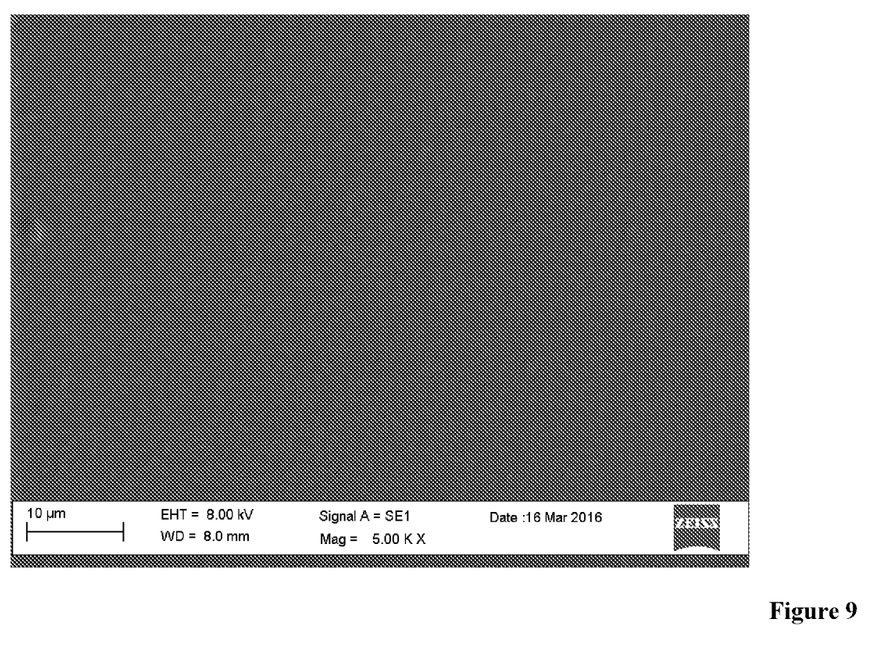
FIG. 9 is a SEM view of the pectin based film not containing any additives.
Figure 10:
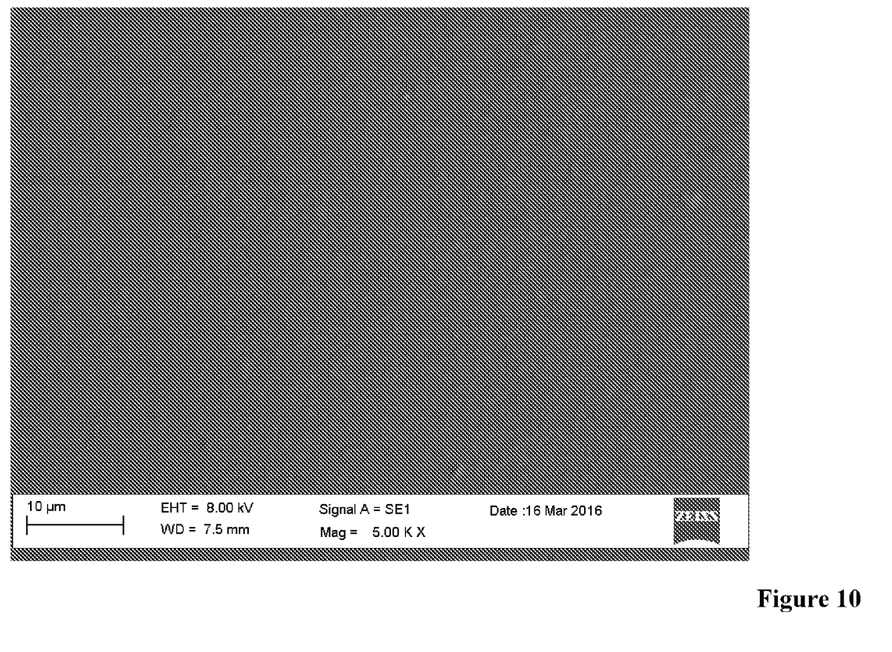
FIG. 10 is a SEM view of the pectin based film containing 15% Boric Acid.
Figure 11:
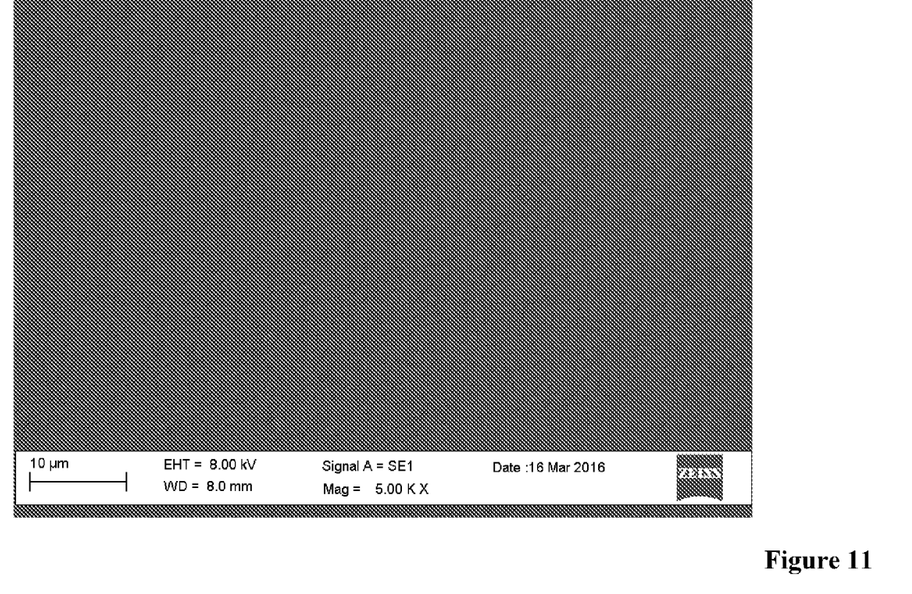
FIG. 11 is a SEM view of the pectin based film containing 10% Disodium octaborate.
Figure 12:
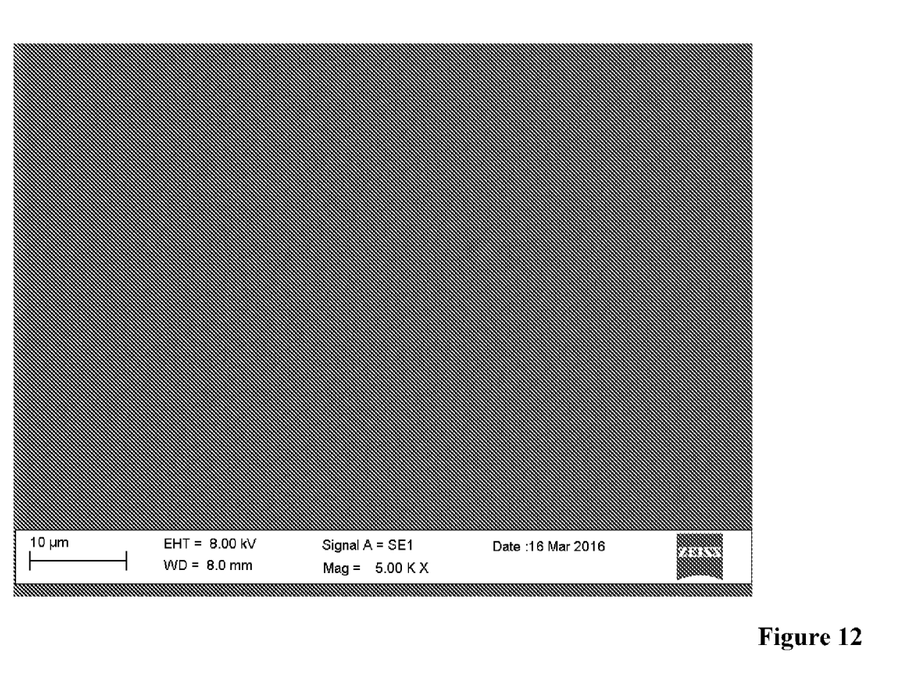
FIG. 12 is a SEM view of the pectin based film containing 5% Sodium Pentaborate.
Figure 13:
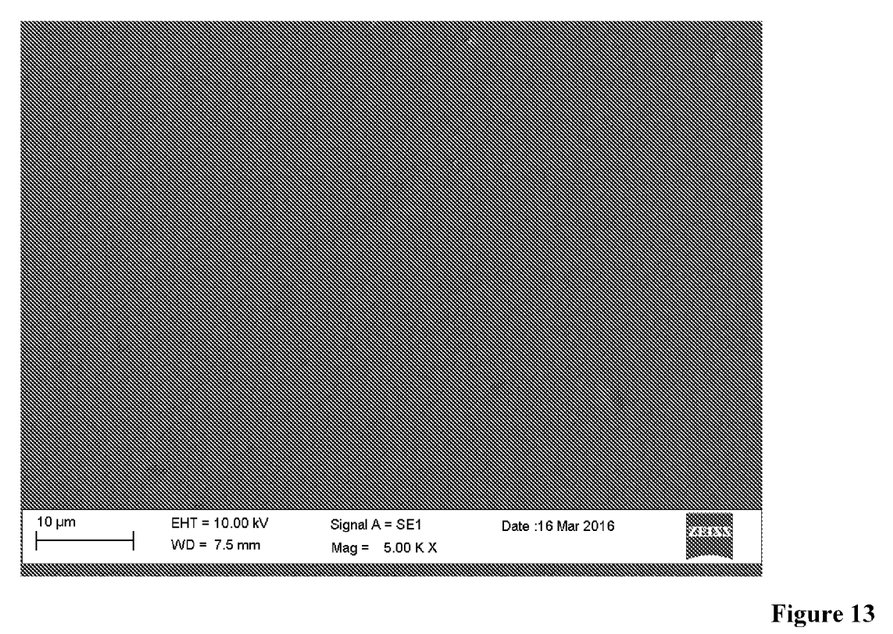
FIG. 13 is a SEM view of the gelatin based film not containing any additives.
Figure 14:
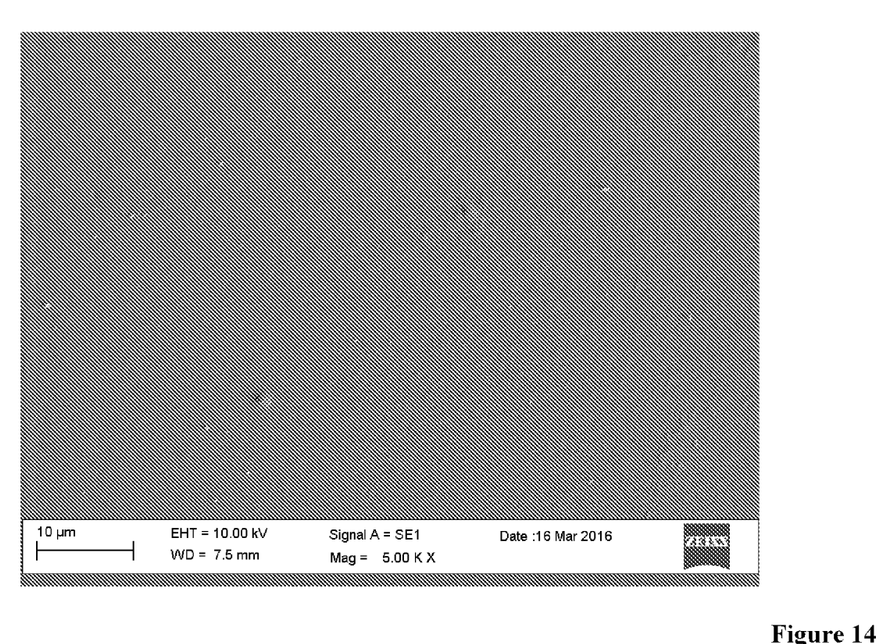
FIG. 14 is a SEM view of the gelatin based film containing 10% Boric Acid.
Figure 15:
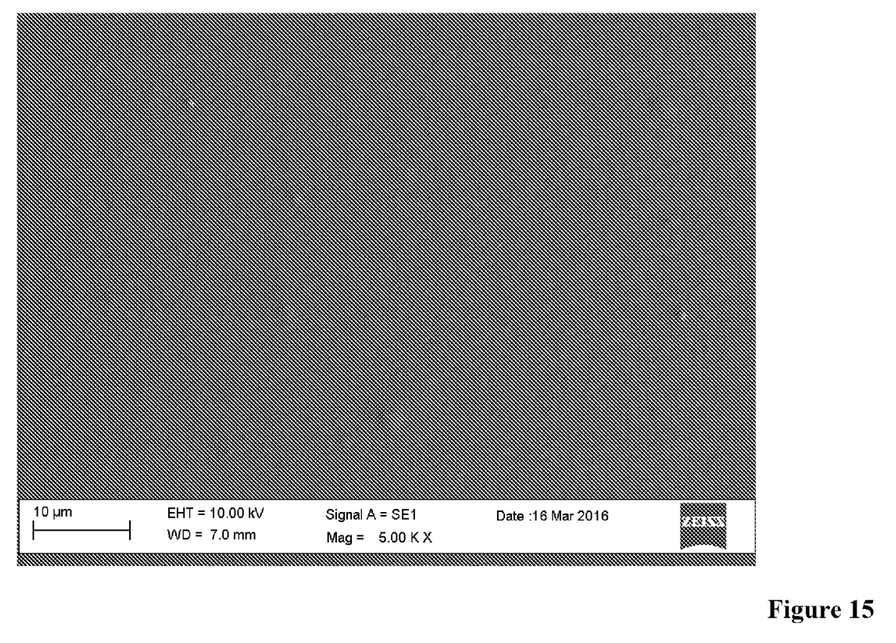
FIG. 15 is a SEM view of the gelatin based film containing 5% Disodium octaborate.
Figure 16:
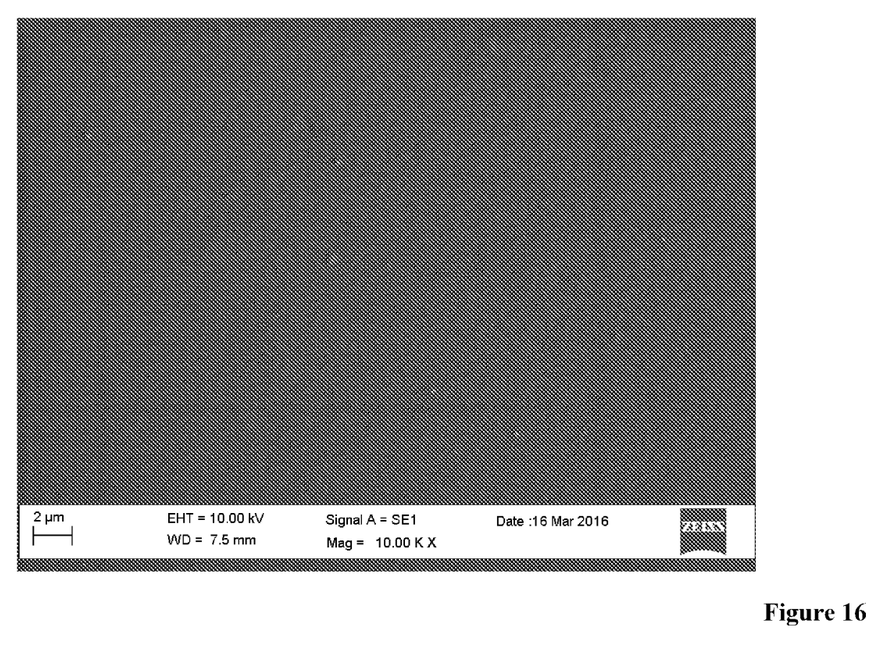
FIG. 16 is a SEM view of the gelatin based film containing 15% Sodium Pentaborate.

Standard NCCLS disc diffusion method [24] was used by being modified in order to determine the antimicrobial activity of boron compounds on each microorganism that is being tested. The 100 μl solution including $10^8$ cfu/ml bacteria, $10^6$ cfu/ml yeast and $10^4$ spor/ml fungi was prepared with new cultures and inoculated with spreading method on Nutrient Agar (NA), Sabouraud Dextrose Agar (SDA) and Potato Dextrose Agar (PDA), respectively. Antimicrobial activity tests were conducted against *Staphylococcus aerus* among gram-positive bacteria, *Eshericia coli* and *Pseudomonas aeruginosa* among gram-positive bacteria, *Candida albicans* among yeasts and *Aspergillus niger* among fungi. The developed film surfaces and the control groups were cut in sizes of 1×1 cm and were placed into the inoculated petri dishes. Placement of the boron-containing film materials in the petri dishes are shown in FIG. 1. The petri dishes, which were inoculated and on which modified disc diffusion method was applied, were incubated for 24 hours for bacteria and 48 hours for yeasts at 36±1° C., and for 72 hours for fungi at 25±1° C. Antimicrobial activity against microorganisms tested with modified disc diffusion method was assessed by measuring the inhibition zone (area where microorganisms do not grow). Antimicrobial activity test results of the tested boron-containing film surfaces are summarized in Table 1 and all of the tests were repeated at least twice.

Experimental Results

Antimicrobial Test Results:

Antimicrobial activity test results of the tested boron compounds are summarized in Table 1. All tests were repeated at least twice.

TABLE 1

Antimicrobial activity of Boric Acid (BA), Disodium Octaborate (DO), Sodium Pentaborate (SP) doped surfaces and the Control (K) group on the tested microorganisms.

| Biopolymer | Active | Concentration | S. aureus | P. aeruginosa | E. coli | C. albicans | A. niger |
|---|---|---|---|---|---|---|---|
| Gelatin | K | 0% | − | − | − | − | − |
|  | BA | 5% | + | + | − | − | + |
|  |  | 10% | + | + | − | + | + |
|  |  | 15% | + | + | + | + | + |
|  | DO | 5% | + | + | − | + | + |
|  |  | 10% | + | + | − | + | + |
|  |  | 15% | + | + | + | + | + |
|  | SP | 5% | + | + | − | + | + |
|  |  | 10% | + | + | − | + | + |
|  |  | 15% | + | + | − | + | + |
| Pectin | K | 0% | − | − | − | − | − |
|  | BA | 5% | − | − | − | − | + |
|  |  | 10% | + | + | − | + | + |
|  |  | 15% | + | + | − | − | + |
|  | DO | 5% | + | − | − | − | + |
|  |  | 10% | + | + | − | + | + |
|  |  | 15% | + | + | − | + | + |
|  | SP | 5% | + | − | − | − | + |
|  |  | 10% | + | + | − | + | + |
|  |  | 15% | + | + | − | + | + |

Determining the Morphological Properties

Morphological properties of the developed gelatin or pectin based boron-doped food film packages were determined by using a SEM device (EVO 40 series, Carl Zeiss, Germany). As a result of the SEM images, it was observed that the boron compounds were completely dispersed in the film. SEM image samples are given in FIGS. 9-15.

Determining the Mechanical Properties

Tensile strength of a film shows mechanical strength of it. Mechanical properties of biopolymer films are very important to be able to use them as a packaging material. Since doping with boron derivatives may change mechanical properties of the films, the produced films were subjected to physical characterization tests. Tensile strengths of the film samples of the present invention are shown in Table 2 and Table 3, respectively. The obtained results show that the negative control samples which are not doped with boron derivatives have a lower resistance in comparison to the other samples.

Tensile strengths of the gelatin based films vary in the range of 8626 to 17845 grams under the effect of different boron derivatives added in different ratios. It is found that the gelatin film sample comprising 10% disodium octaborate has the highest resistance (17845 g). In view of all of the results, it is seen that disodium octaborate significantly affects resistance of the gelatin films in a positive manner. While the increase in boric acid concentration increased resistance of the gelatin films, concentrations of sodium pentaborate and disodium octaborate above 10% did not exhibit a positive influence on film resistance. It is considered that this originates from the fact that above a certain level of concentration the boron derivate accumulates at a high level between the molecules and chains thereby preventing formation of crosslinks. Since molecular weight of boric acid is lower than the other boron derivatives that are used, it is considered that the same effect cannot be observed in the films containing boric acid. Furthermore, as disodium octaborate and sodium pentaborate have a greater ionic charge than boric acid, above a certain concentration it may have caused deformation of the hydrogen bonds that strengthen the gelatin matrix.

On the other hand, tensile strengths of the pectin film samples vary in the range of 963 to 2170 grams. While the highest tensile strength was obtained by addition of sodium pentaborate of 15% concentration, concentrations of disodium octaborate and boric acid above 10% did not exhibit a positive influence on the film resistance. It is considered that the changes in the tensile strengths of the pectin based films originated from the formation of crosslinks between the boron and pectic polysaccharides.

TABLE 2

Tensile strengths of gelatin based film surfaces

| Active | Ratio (%) | Tensile Strength (g) | | | Average (g) | Std. |
|---|---|---|---|---|---|---|
| | | 1 | 2 | 3 | | |
| - (Control) | | 8626 | 9428 | 11498 | 9851 | 1482 |
| Boric Acid | 5 | 12101 | 12348 | 12710 | 12386 | 306 |
| | 10 | 14234 | 12371 | 14559 | 13721 | 1181 |
| | 15 | 14483 | 13633 | 13601 | 13906 | 500 |
| Sodium Pentaborate | 5 | 11489 | 11644 | 10992 | 11375 | 341 |
| | 10 | 12097 | 12854 | 13252 | 12734 | 587 |
| | 15 | 11139 | 11757 | 12106 | 11667 | 490 |
| Disodium Octaborate | 5 | 15135 | 16313 | 16702 | 16050 | 816 |
| | 10 | 17264 | 17845 | 16408 | 17172 | 723 |
| | 15 | 16266 | 16134 | 13354 | 15251 | 1644 |

TABLE 3

Tensile strengths of pectin based film surfaces

| Active | Ratio (%) | Tensile Strength (g) | | | Average (g) | Std. |
|---|---|---|---|---|---|---|
| | | 1 | 2 | 3 | | |
| - (Control) | | 849 | 1109 | 932 | 963 | 133 |
| Boric Acid | 5 | 1623 | 1649 | 1853 | 1708 | 126 |
| | 10 | 1672 | 1712 | 1825 | 1736 | 79 |
| | 15 | 1603 | 1601 | 1588 | 1597 | 8 |
| Sodium Pentaborate | 5 | 1452 | 1403 | 1514 | 1456 | 56 |
| | 10 | 1755 | 2229 | 2363 | 2116 | 319 |
| | 15 | 2044 | 2118 | 2349 | 2170 | 159 |
| Disodium Octaborate | 5 | 1066 | 1130 | 1015 | 1070 | 58 |
| | 10 | 1970 | 2082 | 1883 | 1978 | 100 |
| | 15 | 1533 | 1395 | 1369 | 1432 | 88 |

As the molecular sequence converges, film surfaces tend to get thinner. Thus, addition of boron influences thickness of the gelatin or pectin based film surfaces. Interaction of boron with RG-II, which is inherent in pectin, causes the film to be thinner. Therefore boron containing films are thinner than the control groups. Since different boron compounds influence cross-links of biopolymers at different extents, a different thickness is obtained at each sample. Addition of boron compounds does not have an important influence on the thicknesses of the gelatin films. Table 4 and Table 5 show thicknesses of the boron compound-doped gelatin and pectin based film samples.

TABLE 4

Thicknesses of the gelatin based films containing boron compounds

| Active | Ratio (%) | Thickness (mm) | | Average (mm) | Std. |
|---|---|---|---|---|---|
| - (Control) | 0 | 0.26 | 0.25 | 0.26 | 0.01 |
| Boric Acid | 5 | 0.22 | 0.25 | 0.24 | 0.02 |
| | 10 | 0.29 | 0.28 | 0.29 | 0.01 |
| | 15 | 0.27 | 0.29 | 0.28 | 0.01 |
| Sodium Pentaborate | 5 | 0.25 | 0.26 | 0.26 | 0.01 |
| | 10 | 0.26 | 0.24 | 0.25 | 0.01 |
| | 15 | 0.26 | 0.26 | 0.26 | 0.00 |
| Disodium Octaborate | 5 | 0.25 | 0.26 | 0.26 | 0.01 |
| | 10 | 0.28 | 0.28 | 0.28 | 0.00 |
| | 15 | 0.28 | 0.28 | 0.28 | 0.00 |

TABLE 5

Thicknesses of the pectin based films containing boron compounds

| Active | Ratio (%) | Thickness (mm) | | Average (mm) | Std. |
|---|---|---|---|---|---|
| - (Control) | 0 | 0.2 | 0.21 | 0.21 | 0.01 |
| Boric Acid | 5 | 0.14 | 0.13 | 0.14 | 0.01 |
| | 10 | 0.16 | 0.15 | 0.16 | 0.01 |
| | 15 | 0.14 | 0.13 | 0.14 | 0.01 |
| Sodium Pentaborate | 5 | 0.18 | 0.18 | 0.18 | 0.00 |
| | 10 | 0.15 | 0.15 | 0.15 | 0.00 |
| | 15 | 0.16 | 0.15 | 0.16 | 0.01 |

TABLE 5-continued

Thicknesses of the pectin based films containing boron compounds

| Active | Ratio (%) | Thickness (mm) | | Average (mm) | Std. |
|---|---|---|---|---|---|
| Disodium | 5 | 0.18 | 0.17 | 0.18 | 0.01 |
| Octaborate | 10 | 0.18 | 0.18 | 0.18 | 0.00 |
|  | 15 | 0.16 | 0.15 | 0.16 | 0.01 |

Determining the Rheological Properties

Since gelatin has a thermoreversible gelling mechanism, the effects of boron compounds on gelling and melting temperatures are investigated by rheological tests. It is observed that boron compounds do not significantly change gelling and melting temperatures or deform gel structure. Changes in melting ($T_m$) and gelling ($T_g$) temperatures of the gelatin gels are given in Table 6.

Figure 17:
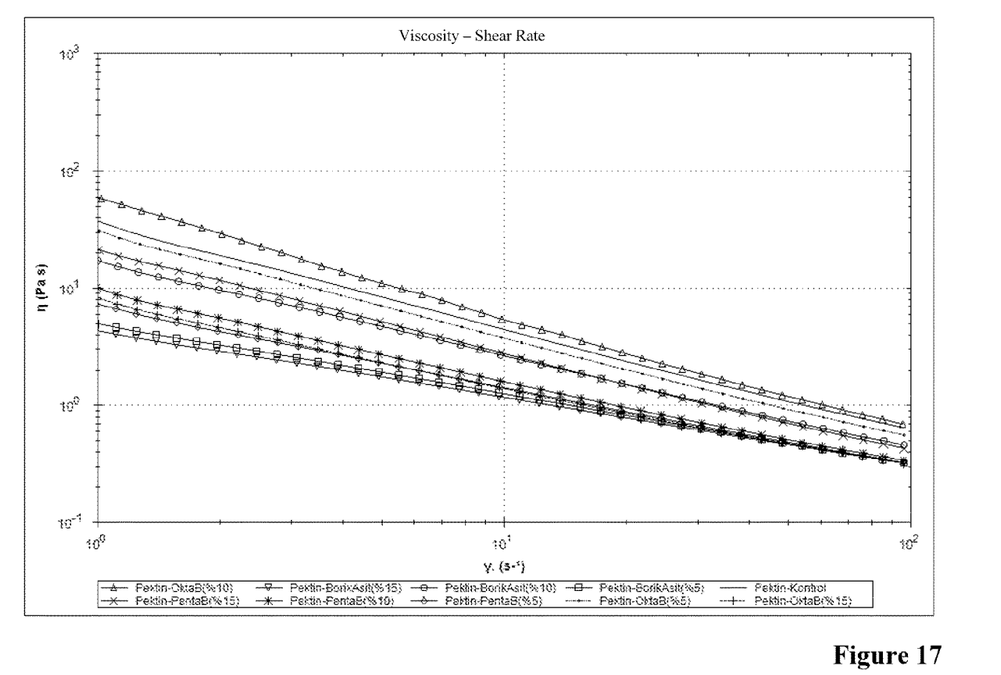
FIG. 17 is a view of the viscosity of the gel solutions comprising pectin+boron derivatives according to changing shear rate.
Figure 18:
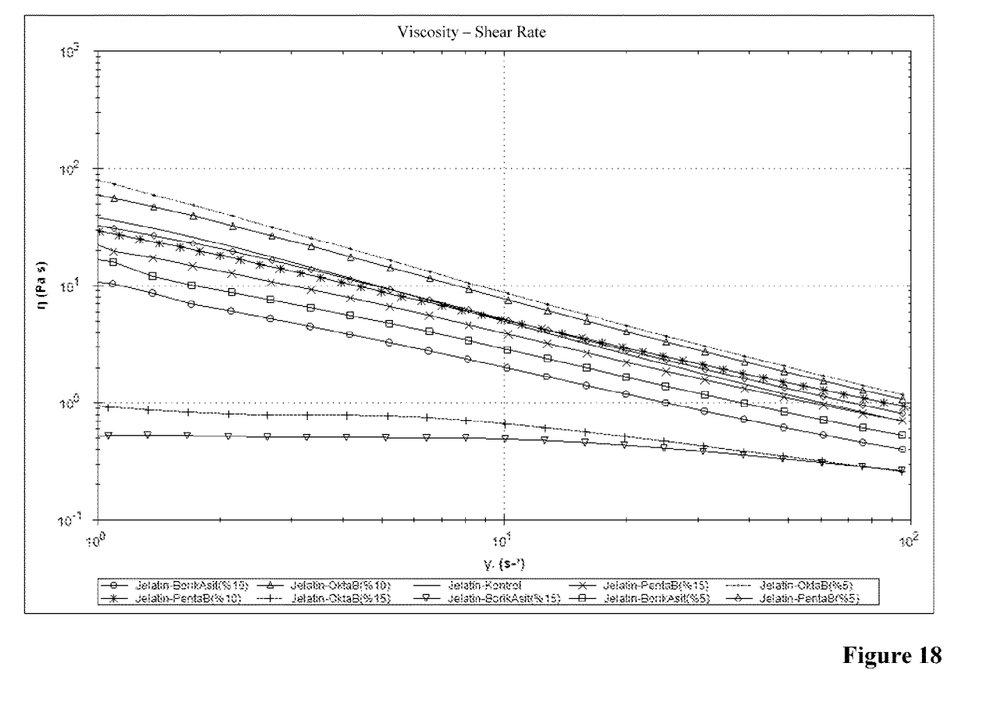
FIG. 18 is a view of the viscosity of the gel solutions comprising gelatin+boron derivatives according to the changing shear rate.

Viscosity graphics of the pectin or gelatin based gel solutions containing 3 different boron derivatives of different concentrations according to the changing shear rates are given in FIG. 17 and FIG. 18. All of the gelatin and pectin samples have exhibited shear thinning behavior. While the pectin sample containing 15% (w/w) boric acid has the lowest viscosity value, the pectin sample containing 10% (w/w) disodium octaborate has the highest viscosity value. In gelatin based films, disodium octaborate-added gelatin solutions have the highest viscosity value. Addition of boric acid has caused a decrease in the viscosity of the gelatin.

TABLE 6

Melting ($T_m$) and Gelling ($T_g$) Temperatures of Gelatin Gels Doped with Boron Derivatives

| Ratio (%) | Control | Boric Acid | | | Disodium Octaborate | | | Sodium Pentaborate | | |
|---|---|---|---|---|---|---|---|---|---|---|
|  | 0 | 5 | 10 | 15 | 5 | 10 | 15 | 5 | 10 | 15 |
| $T_g$ | 22.7° C. | 22.3° C. | 22.2° C. | 21.4° C. | 22.3° C. | 21.8° C. | 21.4° C. | 22.3° C. | 21.9° C. | 21.4° C. |
| $T_m$ | 30.9° C. | 30.7° C. | 30.5° C. | 30.4° C. | 30.9° C. | 31.1° C. | 30.5° C. | 31.1° C. | 30.5° C. | 30.5° C. |

INDUSTRIAL APPLICATIONS

The present invention relates to a gelatin or pectin based antimicrobial surface coating material. The surface coating material is obtained in the form of a film, and used as a packaging material in industrial application. The said packages to be used as coating materials can be used in all fields requiring hygiene particularly in food industry. In food packaging, the surfaces contacting the food and external environment or consumer are antibacterial, antifungal and anticandidal such that they will not be harmful to human health. By means of the present invention, a coating material is developed, which is effective against all kinds of pathogenic factors (bacteria, fungi and viruses) that are present both on the surfaces of and inside the food packages, and which does not harm human health or food quality.

The surface coating material of the present invention is also used in drug and cosmetic industries in addition to food industry. Use thereof as a coating material in pills or tablets in drug industry is another field of use which is alternative to its use on fruits or similar food products.

The said surface coating material can be in the form of a solid powder or liquid solution. It can be applied on fruits and vegetables as a solution via spraying or immersion method.

REFERENCES

1. Mustafa Üçüncü. Gida Ambalajlama Teknolojisi. Meta Press, İzmir, 2007.
2. S. D. F. Mihindukulasuriya and L. T. Tim. Nanotechnology Development in Food Packaging: A Review. Trends in Food Science & Technology, 40:149-167, 2014.
3. B. Luijsterburg and H. Goossens. Assessment of plastic packaging waste: Material origin, methods, properties. Resources, Conservation and Recycling, 2014, 85:88-97.
4. Han, J. H. 2003. Antimicrobial food packaging. In: Ahvenainen R. (Eds), Novel food packaging techniques. CRC Press, sayfa. 50-70.
5. Gordon L. Robertson. Food Packaging Principles and Practice. Taylor & Francis, 2006.
6. P. Prasad and A. Kochhar. Active Packaging in Food Industry: A Review. IOSR Journal of Environmental Science, Toxicology and Food Technology, 8:2319-2402, 2014.
7. L. J. Bastarrachea, D. E. Wong, M. J. Roman, Z. Lin and J. M. Goddard. Review Active Packaging Coatings. Coatings, 5:771-791, 2015.
8. Muriel-Galet, V., Cerisuelo, J. P., Lopez-Carballo G, Aucejo S., Gavara R., Hernandez-Munoz, P. 2013. Evaluation of EVOH-coated PP films with oregano essential oil and citral to improve the shelf-life of packaged salad. Food Control, 30, 137-143.
9. Cerisuelo, J. P., Bermudez, J. M., Aucejo S., Catala R., Gavara R., Hernandez-Munoz P. 2013. Describing and modeling the release of an antimicrobial agent from an active PP/EVOH/PP package for salmon. J. of Food Engineering. 116, 352-361.
10. Cerisuelo, J. P., Bermudez, J. M., Aucejo S., Catala R., Gavara R., Hernandez-Munoz P. 2013. Describing and modeling the release of an antimicrobial agent from an active PP/EVOH/PP package for salmon. J. of Food Engineering. 116, 352-361.
11. Ravishankar, S., Jaroni, D., Zhu, L., Olsen, C., McHugh, T., Friedman, M. 2012. Inactivation of Listeria monocytogenes on Ham and Bologna Using Pectin-Based Apple, Carrot, and Hibiscus Edible Films Containing Carvacrol and Cinnamaldehyde. J. Food Science. 77, 7, M 377-382.
12. Galotto, M. J., Valenzuela, X., Rodriguez, F., Bruna, J., Guarda, A.2012. Evaluation of the Effectiveness of a New Antimicrobial Active Packaging for Fresh Atlantic Salmon (Salmo Salar L.) Shelf Life. Packag. Technol. Sci.; 25: 363-372
13. Suppakul, P., Miltz, J., Sonneveld, K., Bigger, S. W. 2003. Antimicrobial properties of basil and its possible application in food packaging. Journal of Agricultural and Food Chemistry, 51, 3197-3207.
14. Suppakul, P., Sonneveld K., Bigger, S. W. Miltz, J. 2008. Efficacy of polyethylene-based antimicrobial films containing principal constituents of basil. LWT Food Science and Technology, 41, 779-788.

15. A. C. K. Bierhalz, M. A. da Silva and T. G. Kieckbusch. Natamycin Release from Alginate/Pectin Films for Food Packaging Applications. Journal of Food Engineering, 110:18-25, 2012.
16. P. J. Espitia, R. J. Avena-Bustillos, W. X. Du, R. F. Teofilo, N. F. F Soares and T. H. McHugh. Optimal Antimicrobial Formulation and Physical-Mechanical Properties of Edible Films Based on Açaí and Pectin for Food Preservation. Food Packaging and Shelf Life, 2:38-49, 2014.
17. C. G. Otoni, M. R. de Moura, F. A. Aouada, G. P. Camilloto, R. S. Cruz, M. V. Lorevice, N. F. F. Soares and L. H. C. Mattoso. Antimicrobial and Physical-Mechanical Properties of Pectin/Papaya Puree/Cinnamaldehyde Nanoemulsion Edible Edible Composite Films. Food Hydrocolloids, 41:188-194, 2014.
18. J. F. Martucci, L. B. Gende, L. M. Neira and R. A. Ruseckaite. Oregano and Lavender Essential Oils as Antioxidant and Antimicrobial Additives of Biogenic Gelatin Films. Industrial Crops and Products, 71:205-213, 2015.
19. Bailey P. J., G. Cousins, G. A. Snow, White A. J.. 1980. Boron-Containing Antibacterial Agents: Effects on Growth and Morphology of Bacteria Under Various Culture Conditions. Antimicrobial Agents and Chemotherapy, 17, 549-553.
20. Benkovic S. J., S. J. Baker, and Alley M. R. 2005. Identification of borinic esters as inhibitors of bacterial cell growth and bacterial methyltransferases, CcrM and MenH. Journal of Medicinal Chemistry, 48, 7468-7476.
21. Reynolds, R. C., Campbell S. R., Fairchild R. G., Kisliuk R. L., Micca P. L., Queener S. F., Riordan J. M., Sedwick W. D., Waud W. R., Leung A. K. W., Dixon R. W., Suling W. J., Borhani D. W. 2007, Novel boron-containing, nonclassical antifolates: Synthesis and preliminary biological and structural evaluation. Journal of Medicinal Chemistry, 50, 3283-3289.
22. Qin G., S. Tian, Z. Chan, Li B. 2007. Crucial role of antioxidant proteins and hydrolytic enzymes in pathogenicity of *Penicillium expansum*. Molecular & Cellular Proteomics, 6, 425-438.
23. Qin G., Y. Zong, Q. Chen, D. Hua, Tian S. 2010, Inhibitory effect of boron against *Botrytis cinerea* on Tablo grapes and its possible mechanisms of action. International Journal of Food Microbiology, 138, 145-150.
24. Lalitha, M. K., Vellore, T. N. 2005. "Manual on antimicrobial susceptibility testing", URL: http://www.ijmm.org/documents/Antimicrobial.doc".

What is claimed is:

1. A gelatin-based antimicrobial surface coating material, comprising a gelatin and a boron compound,
   the boron compound comprising boric acid, sodium pentaborate, or disodium octaborate;
   the boron compound being cross-linked with the gelatin, and wherein the boron compound is 5% to 15% by mass of the boron compound cross-linked gelatin.

2. The gelatin-based antimicrobial surface coating material according to claim 1, comprising 5% to 15% by mass of sodium pentaborate.

3. The gelatin-based antimicrobial surface coating material according to claim 1, comprising 5% to 15% by mass of disodium octaborate.

4. The gelatin-based antimicrobial surface coating material according to claim 1, possessing antibacterial properties against *Escherichia coli, Staphylococcus aureus, Pseudomonas aeruginosa* bacteria.

5. The gelatin-based antimicrobial surface coating material according to claim 1, possessing antibacterial properties against *Escherichia coli, Staphylococcus aureus, Pseudomonas aeruginosa* bacteria.

6. The gelatin-based antimicrobial surface coating material according to claim 4, possessing anticandidal properties against *Candida albicans* yeast.

7. The gelatin-based antimicrobial surface coating material according to claim 5, possessing anticandidal properties against *Candida albicans* yeast.

8. The gelatin-based antimicrobial surface coating material according to claim 6, possessing antifungal properties against *Aspergillus niger* fungus.

9. The gelatin-based antimicrobial surface coating material according to claim 7, possessing antifungal properties against *Aspergillus niger* fungus.

10. The gelatin-based antimicrobial surface coating material according to claim 1, wherein the gelatin-based antimicrobial surface coating material forms a single layer, the gelatin and the boron compound being in the same single layer.

11. The gelatin-based antimicrobial surface coating material according to claim 1, comprising 10% to 15% by mass of boric acid.

12. The gelatin-based antimicrobial surface coating material according to claim 1, comprising 10% to 15% by mass of sodium pentaborate.

13. The gelatin-based antimicrobial surface coating material according to claim 1, comprising 10% to 15% by mass of disodium octaborate.

14. The gelatin-based antimicrobial surface coating material according to claim 1, comprising 10% by mass of boric acid.

15. The gelatin-based antimicrobial surface coating material according to claim 1, comprising 10% by mass of sodium pentaborate.

16. The gelatin-based antimicrobial surface coating material according to claim 1, comprising 10% by mass of disodium octaborate.

17. The gelatin-based antimicrobial surface coating material according to claim 1, wherein the gelatin-based antimicrobial surface coating material is an antimicrobial material in packaging industry requiring hygiene.

18. The gelatin-based antimicrobial surface coating material according to claim 1, wherein the gelatin-based antimicrobial surface coating material is in a form of a liquid or powder.

19. The gelatin-based antimicrobial surface coating material according to claim 1, wherein the gelatin-based antimicrobial surface coating material is an antimicrobial material to protect fruits and vegetables via spraying or immersion.

20. The gelatin-based antimicrobial surface coating material according to claim 1, the gelatin-based antimicrobial surface coating material forming a sealed barrier around a biodegradable substance to prevent exposure or release of the biodegradable substance to an environment external to the barrier, the sealed barrier being air-tight and liquid-tight.

* * * * *